(12) United States Patent
Kramer

(10) Patent No.: US 6,580,231 B1
(45) Date of Patent: Jun. 17, 2003

(54) COLOR MIXING IN HID LAMP AT VHF FREQUENCIES

(75) Inventor: Jerry M. Kramer, Yorktown Heights, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 10/011,999

(22) Filed: Dec. 5, 2001

(51) Int. Cl.[7] .......................... H05B 37/02; H05B 39/04
(52) U.S. Cl. ................................................ 315/291
(58) Field of Search ................................ 315/244, 246, 315/248, 291, 307

(56) References Cited

U.S. PATENT DOCUMENTS

| | | | | |
|---|---|---|---|---|
| 4,373,146 A | * | 2/1983 | Bonazoli et al. | 315/174 |
| 4,441,054 A | | 4/1984 | Bay | 315/219 |
| 4,492,940 A | * | 1/1985 | Hikita | 310/313 B |
| 4,893,057 A | | 1/1990 | Tillman et al. | 313/631 |
| 4,894,587 A | | 1/1990 | Jungreis et al. | 325/200 R |
| 5,371,440 A | * | 12/1994 | Liu et al. | 315/209 R |
| 5,828,185 A | * | 10/1998 | Fellows et al. | 313/318.01 |
| 5,920,155 A | * | 7/1999 | Kanda et al. | 315/209 R |
| 5,923,128 A | * | 7/1999 | Canova | 315/224 |
| 6,184,633 B1 | * | 2/2001 | Kramer | 315/246 |
| 6,400,100 B1 | * | 6/2002 | Kramer | 315/194 |
| 6,426,599 B1 | * | 7/2002 | Leeb | 315/200 R |
| 6,437,517 B1 | * | 8/2002 | Kramer | 315/246 |

FOREIGN PATENT DOCUMENTS

| | | | | |
|---|---|---|---|---|
| DE | 19535662 A | | 3/1997 | H05B/41/36 |
| EP | 0291223 A1 | | 11/1988 | H05B/41/24 |

* cited by examiner

Primary Examiner—Don Wong
Assistant Examiner—Minh D A

(57) ABSTRACT

Stable illumination of uniform color and reduced sensitivity to lamp orientation are achieved by driving a high-intensity discharge (HID) lamp with a carrier signal alternated between two VHF frequencies at a modulation rate approximately equal the second longitudinal frequency of the lamp, and feeding the signal through a filter having an inverse amplitude relationship to carrier frequency, to produce an input signal to the lamp that is amplitude modulated in an inverse relationship to the change in carrier frequency at a modulation rate approximately equal to the second longitudinal resonance of the lamp.

21 Claims, 1 Drawing Sheet

COLOR MIXING IN HID LAMP AT VHF FREQUENCIES

TECHNICAL FIELD OF THE INVENTION

This invention relates to a power supply for a high-intensity discharge (HID) lamp that requires a modulated input signal for proper operation.

BACKGROUND OF THE INVENTION

Certain types of electrical lamps operate more efficiently or effectively when driven by an input current signal that is both alternating and modulated in some manner. One example of such a lamp is a high-intensity gas discharge (HID) lamp, of the type used indoors or outdoors for general illumination of parking lots and buildings. Proper operation of such lamps involves driving the lamp with a signal that results in illumination that is both stable, and of uniform color. It is also desirable that such lamps be insensitive to orientation of the lamp, producing stable illumination of uniform color when the lamp is oriented vertically, horizontally, or in some other position.

As disclosed in U.S. Pat. No. 6,184,633 B1, the operational stability and uniformity of light generated by such HID lamps can be improved by driving the lamp with a swept frequency input signal that is either amplitude modulated, or sequentially alternated with a periodic change in the range of the swept frequency. In particular, an input signal is disclosed that includes a current frequency sweep from 45 to 55 kHz within a sweep time of about 10 milliseconds, in combination with either: a constant amplitude modulation frequency of about 24.5 Hz and a modulation index of 0.24; or a periodic sequential change in sweep frequency to about 12.3 kHz. In the '633 B1 patent, the swept frequency and amplitude modulating signals are generated separately and combined to produce the signal actually fed to the HID lamp. The modulation frequency is predetermined and maintained as a constant.

U.S. patent application Ser. No. 09/620,357, commonly assigned to the original assignee of the present application, provides additional methods and apparatus for determining the optimum modulation frequency and/or sequential operating frequency, through sequential and periodic measurements of the HID lamp voltage at various amplitude modulating frequencies within a predetermined range of frequencies. Once the appropriate values are determined, the '357 application utilizes the methods and apparatus disclosed in the '633 B1 patent for producing the input waveform.

U.S. patent application Ser. No. 09/916,953, commonly assigned to the original assignee of the present application, provides a method for operating a power source adapted to supply an input signal having an alternating current and voltage to an electrical load in a manner providing a desired power spectrum to the electrical load. The method includes calculating a portion of the power spectrum being delivered to the electrical load by the input signal, and modifying the input signal in such a manner that the delivered power spectrum more closely matches the desired power spectrum. The step of calculating a portion of the delivered power spectrum may include monitoring and integrating the alternating current and voltage of the input signal. The method may further include storing a representation of the desired power spectrum in the power source.

Although the teachings of the above referenced patent and applications provide considerably improved performance with HID lamps, the cost and complexity of the power supplies and control methods that they teach may be prohibitive. What is needed, therefore, is an improved power supply and method adapted for driving an HID lamp, which provides the operational advantages of the prior art, but can be produced in a more straightforward manner.

SUMMARY OF THE INVENTION

My invention provides such an improved power supply and method, that produces stable illumination of uniform color and reduced sensitivity to lamp orientation, by driving a high-intensity discharge (HID) lamp with a carrier signal alternated between two very high frequency (VHF) frequencies at a modulation rate approximately equal the second longitudinal frequency of the lamp, and feeding the signal through a filter having an inverse amplitude relationship to carrier frequency, to produce an input signal to the lamp that is amplitude modulated in an inverse relationship to the change in carrier frequency at a modulation rate approximately equal to the second longitudinal resonance frequency of the lamp. The two VHF frequencies are selected from a range of frequencies over which acoustic resonances are substantially damped and lamp operation is stable.

Driving the lamp in this manner results in stable illumination of uniform color and reduced sensitivity to lamp orientation, without the additional circuitry required in prior power supplies for modulating amplitude of the signal driving the lamp. Elimination of such amplitude modulating circuitry, in a power supply according to my invention, reduces the complexity and cost of the power supply.

One form of my invention provides a method for operating a high-intensity discharge lamp by supplying the lamp with an input waveform having a carrier frequency that is alternated at a modulation frequency between a first carrier frequency and a second carrier frequency higher than the first carrier frequency, and filtered by a filter circuit having an inverse amplitude relationship to carrier frequency, to thereby provide an input waveform that is amplitude modulated at the modulation frequency between a first amplitude at the first carrier frequency and a second amplitude lower than the first amplitude at the second carrier frequency. The method may include exciting a longitudinal acoustic mode in the lamp at a longitudinal resonance frequency by modulating the carrier frequency at a modulation frequency that is approximately equal to the longitudinal resonance frequency of the lamp. Where the high-intensity discharge lamp has a second longitudinal resonance frequency, the modulation frequency may be approximately equal to the second longitudinal resonance frequency of the lamp.

The method may include determining the longitudinal resonance frequencies of the lamp. The method may also include determining values for the first and second carrier frequencies, or a range of values bounded by the first and second carrier frequencies, at which illumination from the lamp is stable. The first and second carrier frequencies may be VHF frequencies.

Another form of my invention provides an apparatus for operating a high-intensity discharge lamp. The apparatus may include means for supplying the lamp with an input waveform having a carrier frequency alternated at a modulation frequency between a first carrier frequency and a second carrier frequency higher than the first carrier frequency, and a filter having an inverse amplitude relationship to carrier frequency operatively attached for filtering the input waveform to provide a waveform for driving the lamp that is amplitude modulated at the modulation frequency between a first amplitude at the first carrier frequency and a second amplitude lower than the first amplitude at the second carrier frequency.

Where the lamp has a longitudinal acoustic mode that is excitable at a longitudinal resonance frequency, the modulation frequency may be approximately equal to the longitudinal resonance frequency of the lamp. Where the high-intensity discharge lamp has a second longitudinal resonance frequency, the modulation frequency may be approximately equal to the second longitudinal resonance frequency of the lamp. The first and second carrier frequencies may be VHF frequencies at which the lamp illumination is stable.

The means for supplying the lamp with an input waveform may include a bridge circuit, and a controller for controlling the bridge circuit to produce the input signal. The filter may be a simple LC circuit, or a higher order circuit providing increased attenuation of the input signal as a function of frequency.

The foregoing and other features and advantages of my invention will become further apparent from the following detailed description of exemplary embodiments, read in conjunction with the accompanying drawings. The detailed description and drawings are merely illustrative of my invention rather than limiting, the scope of the invention being defined by the appended claims and equivalents thereof.

BRIEF DESCRIPTION OF THE PRESENTLY PREFERRED EMBODIMENTS

Figure 1:
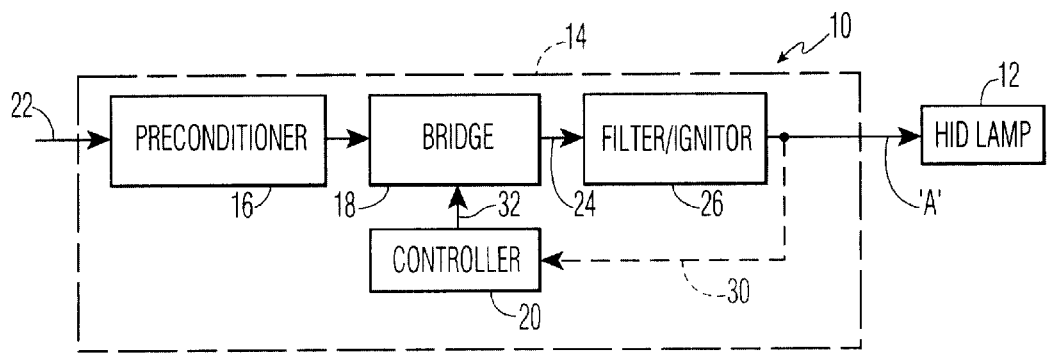
FIG. 1 is a block diagram of an exemplary apparatus according to my invention

FIG. 1 shows an exemplary apparatus 10, according to my invention, for providing an input signal 'A' to a high-intensity discharge (HID) lamp 12. The input signal has a waveform that is amplitude modulated in an inverse relationship to changes in carrier frequency of the input signal 'A' at a modulation rate approximately equal to the second longitudinal resonance frequency of the lamp 12.

Figure 3:
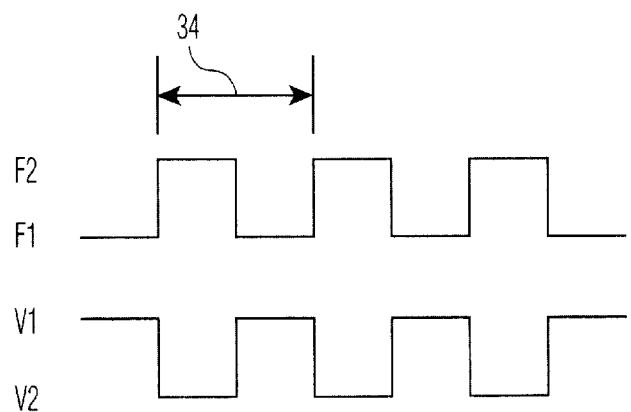
FIG. 3 is an illustration showing the inverse relationship of amplitude and frequency in the input waveform provided by an apparatus or method according to my invention.

Specifically, the apparatus 10 depicted in FIG. 1 is in the form of a power source or ballast 14 for driving the high intensity discharge (HID) lamp 12. The power source 14 includes means, in the form of a preconditioner 16 and bridge 18, connected in a series circuit relationship, and a controller 20 operatively connected to the bridge 18, for receiving a power input 22 and generating a square wave 24 having a carrier frequency alternated at a modulation frequency 34 between a first carrier frequency F1 and a second carrier frequency F2 higher than the first carrier frequency F1, as illustrated in the upper curve of FIG. 3. The bridge 18 may be either a full or a half bridge circuit, to suit the needs of various forms of my invention.

The controller 20 controls the carrier frequency of the bridge 18. The shape of the control waveform 32 applied to the bridge 18 by the controller 20 to generate the square wave 24 is not critical in practicing my invention, so long as the waveform 32 is alternated between the first and second carrier frequencies F1, F2 at a modulation frequency 34 that is approximately equal to the second longitudinal resonance frequency of the lamp 12. For example, the control waveform 32 may be a sine wave at the modulation frequency 34, but can also be a square or triangular wave at the modulation frequency 34, because a square or triangular wave both have frequency components at the fundamental frequency of the sine wave, and it is these fundamental frequency components that are important in practicing my invention.

The square wave 24 is applied to the input of a filter in the form of a filter/ignitor 26. The filter/ignitor 26 includes an LC filter circuit producing a filtered signal having the inverse amplitude relationship to carrier frequency desired in the input waveform 'A' for driving the lamp 12, as illustrated in FIG. 2.

Figure 2:
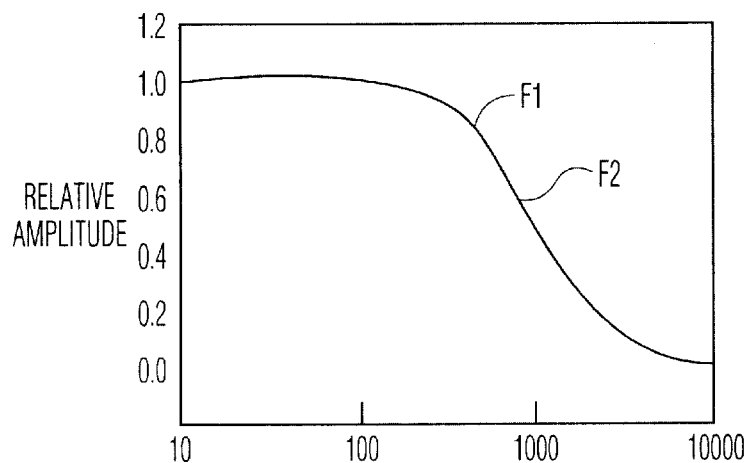
FIG. 2 is graph of amplitude versus frequency for a filter that attenuates the amplitude of a signal applied to the filter in an inverse relationship to the frequency of the signal applied to the filter.

The filter depicted in FIG. 2 is a simple LC filter of common construction, having components judiciously selected to produce an output characteristic which is relatively steep between a desired first and second carrier frequency F1, F2, such that the amplitude of the input waveform 'A' is attenuated between a first amplitude V1 at the first carrier frequency F1 and a second amplitude V2, lower than the first amplitude V1 at the second carrier frequency F2. The slope of the output characteristic may be increased by using a higher order filter, if greater attenuation is required between a given first and second carrier frequency F1, F2.

Those having skill in the art will recognize that filters having the characteristics described above, and depicted in FIG. 2, are often used for dimming fluorescent lights by increasing the operational frequency.

Furthermore, as described in detail in the commonly assigned patents and patent applications referenced above, which are incorporated herein by reference, it is known that certain types of HID lamps operate with improved color mixing and less sensitivity to orientation when an operating characteristic of such lamps, known as a longitudinal acoustic resonance mode, is excited by the input signal used to drive the lamp. Ceramic HID metal halide lamps exhibit such operating characteristics. One method known to excite the longitudinal mode, is to amplitude modulate the carrier frequency of the input signal at the frequency of the second longitudinal mode.

The controller 20 of the power supply 14 takes advantage of the operating characteristics of LC filters and HID lamps described above by controlling the carrier frequency of the bridge 18 to modulate the square wave 24 between the first and second carrier frequencies F1, F2 at a modulation frequency substantially equal to the second longitudinal mode frequency of the HID lamp 12. When this frequency modulated square wave signal 24 is filtered by the filter/ignitor 26, the inverse attenuation characteristic of the filter/ignitor 26 produces an input signal 'A' to the lamp 12 which is amplitude modulated at a frequency substantially matching the second longitudinal mode frequency of the HID lamp 12, resulting in an output of the lamp 12 which has improved color uniformity and insensitivity to lamp orientation.

It is also known that in HID lamps of the type described herein, acoustic resonances which cause instability in illumination and operation of the lamp are damped at higher frequencies. By selecting first and second carrier frequencies F1, F2 that are high enough to produce stable illumination, and modulating the amplitude of the input signal 'A' in the manner described above, my invention produces stable illumination, of uniform color, regardless of lamp orientation.

EXAMPLE

For an exemplary HID lamp, known to exhibit stable performance at a VHF frequencies of 400 kHz and above, and having a second longitudinal mode of about 24.5 kHz, values of 450 kHz and 550 kHz might be selected for the first and second carrier frequencies F1, F2, and a value of 24.5 kHz might be selected for the modulation frequency. The control waveform 32 may be a sine wave at 24.5 kHz, but can also be a square or triangular wave at the same frequency, because such a square wave and triangular wave both have frequency components at the fundamental frequency of the sine wave.

The controller 20 operates the bridge 18 to produce a carrier waveform in the form of a square wave 24, frequency modulated as described above at the second longitudinal mode frequency of 24.5 kHz, between the first and second VHF carrier frequencies of 450 kHz and 550 kHz. The filter/ignitor 26 converts the frequency modulated square wave 24 to an amplitude modulated input waveform 'A,' amplitude modulated at the second longitudinal mode frequency of 24.5 kHz. The inverse relationship of the amplitude modulating effect of the filter/ignitor 26 to the frequency modulated square wave 24 produced by the bridge 18 is illustrated schematically in FIG. 3. The filter/ignitor 26 also removes higher harmonics, such that the resulting waveform of the input signal 'A' will actually be a slightly distorted sine wave, frequency modulated between the first and second VHF carrier frequencies of 450 kHz and 550 kHz, and amplitude modulated at a modulation frequency of 24.5 kHz, rather than a square wave.

Regardless of the actual shape of the input waveform 'A,' the lamp 12 will respond to the amplitude modulation of the input signal 'A' at the second longitudinal mode frequency 34, and will produce uniform color in the lamp 12 regardless of lamp orientation. Lamp illumination will be stable, regardless of the shape of the control waveform 32 used to produce the square wave 24, because the lamp 12 is stable at the selected carrier frequencies of 450 kHz and 550 kHz, and also at any intermediate frequencies that the input waveform 'A' may sweep through during modulation between the selected carrier frequencies.

Those having skill in the art will recognize that my invention provides considerable latitude in selecting the carrier frequencies, or the range of carrier frequencies over which the frequency modulation will take place, because above a certain frequency, dependent upon the construction of a given lamp 12, higher order acoustic resonances are damped, and operation is stable.

Through judicious selection of the first and second VHF carrier frequencies F1, F2, to make the difference between the selected VHF carrier frequencies more or less than the values used in the example above, or by using a higher order filter, the amount of amplitude modulation in the input waveform 'A' can be predetermined and controlled, to achieve a desired value of a parameter known as the modulation index. The modulation index is calculated by the following formula:

$$\text{Modulation Index} = \frac{(V_{max} - V_{min})}{(V_{max} + V_{min})}$$

For lamps of the type described herein, it is anticipated that a modulation index in the range of 0 to 0.27 would be preferable during ignition and operation of the lamp 12.

My invention may also take the form of a method for operating an apparatus 10 as described above. Such a method may also include determining the carrier frequency values F1, F2 at which lamp operation is stable. My method may also include determining the optimum modulation frequency value 34. Determination of the optimum modulation frequency 34 from measurements of the lamp voltage may be carried out in the controller 20, using a feedback loop 30, as indicated by dashed line 30 in FIG. 1 to sense and communicate the lamp voltage to the controller 20.

Although the forgoing description has utilized certain exemplary embodiments of my invention, many other changes and modifications can be made without departing from the spirit and scope of the invention. The scope of my invention is limited only by the appended claims, and all changes that come within the meaning and range of equivalents are intended to be embraced therein.

I claim:

1. A method for operating a high-intensity discharge lamp, the method comprising:

supplying the lamp with an input waveform having a carrier frequency alternated at a modulation frequency between a first carrier frequency and a second carrier frequency higher than the first carrier frequency, and filtered by a filter circuit having an inverse amplitude relationship to carrier frequency, thereby providing an input waveform that is amplitude modulated at the modulation frequency between a first amplitude at the first carrier frequency and a second amplitude lower than the first amplitude at the second carrier frequency.

2. The method of claim 1 including exciting a longitudinal acoustic mode in the lamp.

3. The method of claim 2 wherein the longitudinal acoustic mode of the lamp is excited at a longitudinal resonance frequency and the modulation frequency is approximately equal to the longitudinal resonance frequency of the lamp.

4. The method of claim 3 wherein the high-intensity discharge lamp has a second longitudinal resonance frequency and the modulation frequency is approximately equal to the second longitudinal resonance frequency of the lamp.

5. The method of claim 3 including determining the longitudinal resonance frequency of the lamp.

6. The method of claim 5 including monitoring the lamp voltage to determine the longitudinal frequency of the lamp.

7. The method of claim 1 wherein the first and second carrier frequencies are frequencies at which the lamp illumination is stable with respect to acoustic resonances.

8. The method of claim 7 including determining the first and second carrier frequencies.

9. The method of claim 1 wherein the first and second carrier frequencies are in the range of about 400 kHz to 600 kHz, and the modulation frequency is within the range of about 20 kHz to about 30 kHz.

10. The method of claim 9 wherein the amplitude of the input signal has a modulation index in the range of 0 to 0.27.

11. An apparatus for operating a high-intensity discharge lamp, the apparatus comprising:

means for supplying the lamp with an input waveform having a carrier frequency alternated at a modulation frequency between a first carrier frequency and a second carrier frequency higher than the first carrier frequency; and a filter having an inverse amplitude relationship to carrier frequency operatively attached for filtering the input waveform to provide an input waveform that is amplitude modulated at the modulation frequency between a first amplitude at the first carrier frequency and a second amplitude lower than the first amplitude at the second carrier frequency.

12. The apparatus of claim 11 wherein the lamp has a longitudinal acoustic mode that is excitable at a longitudinal resonance frequency and the modulation frequency is approximately equal to the longitudinal resonance frequency of the lamp.

13. The apparatus of claim 12 wherein the high-intensity discharge lamp has a second longitudinal resonance frequency and the modulation frequency is approximately equal to the second longitudinal resonance frequency of the lamp.

14. The apparatus of claim 11 wherein the first and second carrier frequencies are VHF frequencies at which the lamp illumination is stable.

15. The apparatus of claim 11 wherein the first and second carrier frequencies are in the range of about 400 kHz to 600 kHz, and the modulation frequency is within the range of about 20 kHz to about 30 kHz.

16. The apparatus of claim 15 wherein the amplitude of the input signal has a modulation index in the range of 0 to 0.27.

17. The apparatus of claim 11 wherein the means for supplying the lamp with an input signal includes a bridge circuit.

18. The apparatus of claim 17 including a controller for controlling the bridge circuit to produce the input signal.

19. The apparatus of claim 17 wherein the bridge circuit is a half-bridge circuit.

20. The apparatus of claim 11 wherein the filter is an LC filter.

21. The apparatus of claim 20 wherein the filter is a higher order filter.

* * * * *